United States Patent [19]

Minter

[11] Patent Number: 5,033,223
[45] Date of Patent: Jul. 23, 1991

[54] FISHING ROD HOLDER

[76] Inventor: David J. Minter, 319 Midland Ave., Baltimore, Md. 21225

[21] Appl. No.: 403,925

[22] Filed: Sep. 7, 1989

[51] Int. Cl.⁵ ............................................. A01K 97/10
[52] U.S. Cl. ....................................... 43/21.2; 248/538
[58] Field of Search .......................... 43/21.2; 224/922; 248/514, 538

[56]  References Cited

U.S. PATENT DOCUMENTS

| | | | |
|---|---|---|---|
| 2,959,295 | 11/1960 | Howard et al. | 43/21.2 |
| 3,126,180 | 3/1964 | Mandolare | 43/21.2 |
| 3,854,168 | 12/1974 | Bradley | 248/538 |
| 4,455,006 | 6/1984 | Aaserude | 248/538 |
| 4,528,768 | 7/1985 | Anderson | 43/21.2 |
| 4,739,575 | 4/1988 | Behrle | 248/538 |
| 4,827,654 | 5/1989 | Roberts | 248/514 |
| 4,835,896 | 6/1989 | Bowen | 43/21.2 |

Primary Examiner—Kurt Rowan
Attorney, Agent, or Firm—Leonard Bloom

[57]  ABSTRACT

A holder for fishing rods that may be removably mounted on a motor vehicle to support a fishing rod unattended by a fisherman. A bracket engages the bumper of the vehicle and the frame rests against the bumper to provide support. At least one tube is pivotally mounted to the frame and is supported by a support bar to retain the tube in a substantially vertical position with respect to the ground. A fishing rod is received in the tube. The frame also may be disposed on a substantially horizontal surface, independent of the vehicle, with the tube in a position to receive a fishing rod.

9 Claims, 4 Drawing Sheets

FISHING ROD HOLDER

FIELD OF THE INVENTION

The present invention relates to a holder for fishing rods and more particularly to a device which may be removably mounted on a motor vehicle or may be used independently.

BACKGROUND OF THE INVENTION

Fisherman frequently want to relax and not hold a fishing rod continuously while still desiring to have the line in the water to catch fish. When the fisherman's vehicle is near the water, it would be very convenient to have a device to mount on the vehicle which could hold the fishing rod while the fisherman was in the vehicle to avoid the direct sun, to use the vehicle's air conditioning, to get out of the rain or for many other reasons. U.S. Pat. Nos. 3,167,284 issued to Lynch and 3,744,688 issued to Kezer disclose devices for carrying fishing rods on bicycles and U.S. Pat. No. 4,336,897 issued to Luck discloses a rack for carrying bicycles on a motor vehicle. None of these suggest a simple device for removable mounting of a fishing rod on a motor vehicle.

Also, highly desirable would be a fishing rod holder which not only would be mounted on a vehicle but also would serve as a fishing rod holder used independently of the vehicle for those situations where the vehicle is not near the water. While not demountable from a vehicle several devices have been described to hold fishing rods. These include U.S. Pat. Nos. 2,211,278 issued to Le Febvre, 2,264,744 issued to Dunnam, 3,546,805 issued to Schaeffer, 4,086,716 issued to Donahue and 4,603,501 issued to Radcliff.

Thus despite the universal interest in fishing and long recognized problems in having an unattended fishing rod holder, there still remains a need for a single device which is easily and removably mounted on a motor vehicle and which also has utility as a holder for fishing rods independently of the vehicle.

SUMMARY OF THE INVENTION

Accordingly, it is a primary object of the present invention, to provide a simple device for holding fishing rods, which can be easily mounted and removed from a motor vehicle.

It is another object of the invention to provide a device for holding fishing rods which may be removably mounted on a vehicle and also may be used independently of the vehicle.

In accordance with the teachings of the present invention, there is disclosed a fishing rod holder which can be mounted on a motor vehicle to support a fishing rod unattended by a fisherman. The holder comprises a frame; a means for removably mounting the frame on the motor vehicle; and at least one tube pivotally connected to the frame. The mounting is such that the tube may be disposed substantially vertically with respect to the ground and the fishing rod may be received within the tube. Also means are provided for supporting the frame on a substantially horizontal surface independently of the vehicle.

Preferably, the frame of the fishing rod holder comprises a pair of spaced-apart U-shaped members, each having first leg and a second leg. The legs are connected by a bight section. The first legs of the respective members have a first transverse connecting bar therebetween and the second legs of the respective members have a second transverse connecting bar therebetween. The bight sections further have a mid-portion and are connected by a transverse bar therebetween at the mid-portion. The bar has a first end and a second end. The ends extend outwardly from the first U-shaped member and the second U-shaped member respectively. A first tube is pivotally mounted on the first end of the transverse bar. A second tube is pivotally mounted on the second end of the transverse bar. An L-shaped support having a base and a stem is disposed between the second legs of each U-shaped member. A transverse rod connects the base of the L-shaped support with the respective second legs of the U-shaped members. A further transverse rod connects the stem of the L-shaped support with the bight portion of each U-shaped member such that the L-shaped support is securely mounted between the second legs of the U-shaped members with the stem of the L-shaped support extending upwardly and outwardly from the bight sections. The stem further has an end extending outwardly from the bight section. A cross support member is mounted near the end of the stem and perpendicular thereto. The cross support is in the same plane as the transverse rods connecting the base and stem of the L-shaped support. The tubes may be pivoted to rest against the cross support. The means for removably mounting the frame on the motor vehicle comprises a bracket support rotatably mounted between the bight sections of the U-shaped members and disposed adjacent to the mid-portion of the bight section and toward the first legs of the U-shaped members. The bracket support has an end extending outwardly from the frame and above the first legs of the U-shaped member. A bracket is rotatably mounted on the end of the bracket support. The bracket is capable of engaging the bumper of the motor vehicle such that, when the bracket engages the bumper of the vehicle, the first legs of the frame extend downwardly therefrom to contact the bumper and provide support to mount the frame on the vehicle. The tubes, the L-shaped support and second legs extend outwardly from the vehicle such that the fishing rod may be received in the tube and pivotally mounted to rest against the cross support.

The frame may be disposed on a substantially horizontal surface independently of the vehicle and is supported in a stable position by the first and second legs and the first and second transverse bars therebetween.

These and other objects of the present invention will become apparent from a reading of the following specification, taken in conjunction with the enclosed drawings.

DESCRIPTION OF THE PREFERRED EMBODIMENTS

Figure 1:
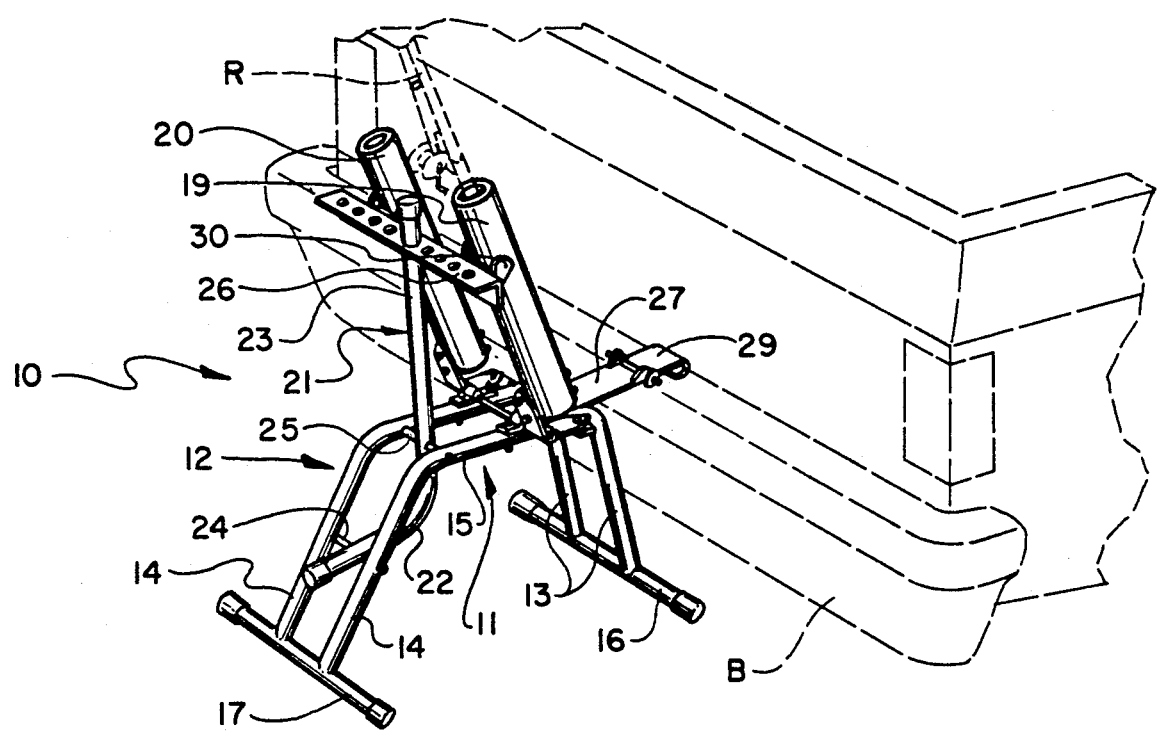
FIG. 1 is a perspective view of the device of the present invention mounted on the bumper of a vehicle and showing a fishing pole on the device (the bumper and the fishing pole shown in broken lines).
Figure 2:
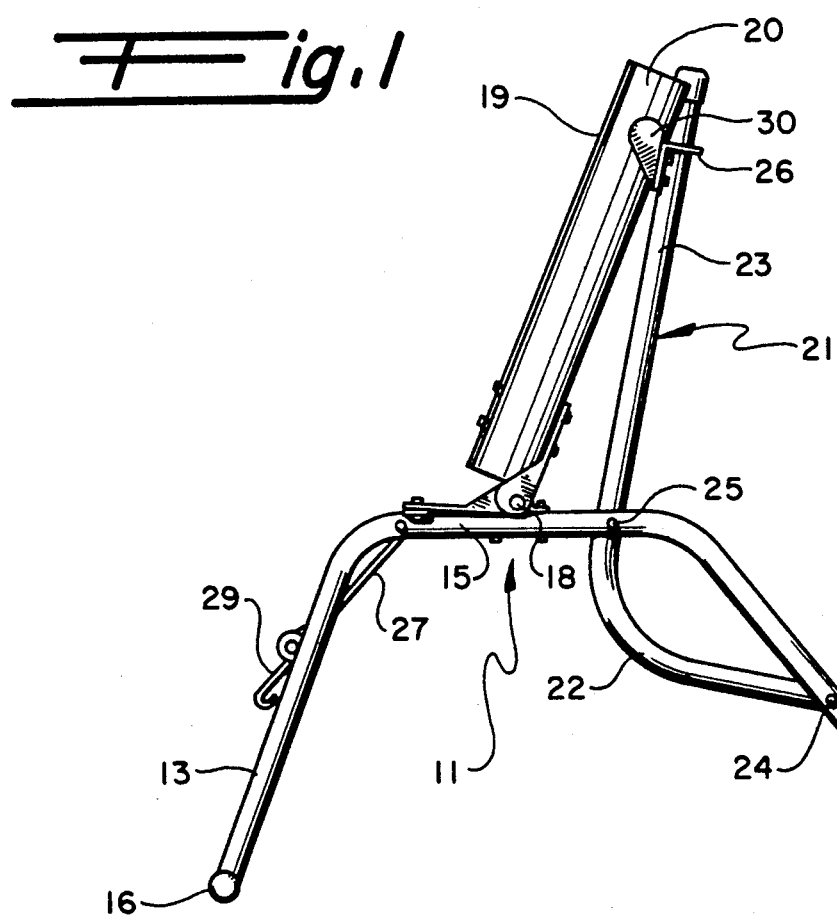
FIG. 2 is a side view of the device.
Figure 3:
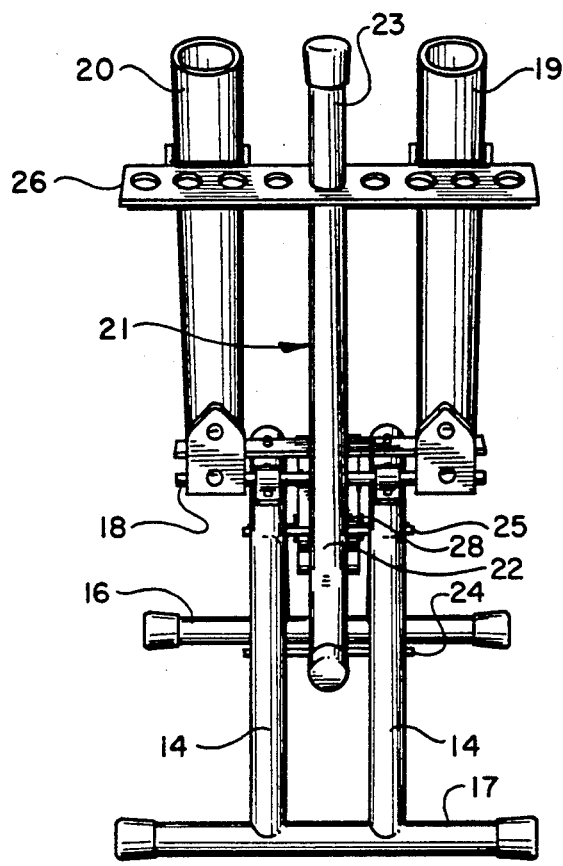
FIG. 3 is a perspective view of the end of the device.
Figure 4:
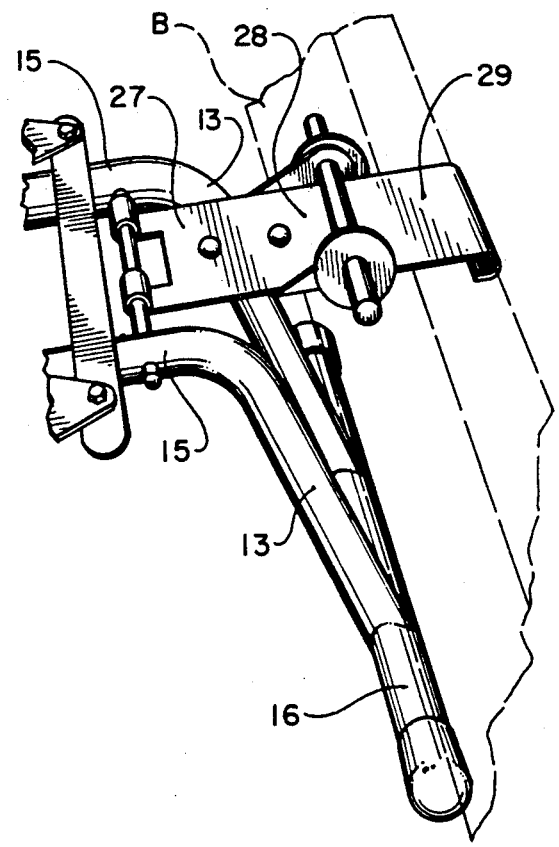
FIG. 4 is an enlarged perspective view of the bracket support and the bracket connected to legs of the device showing bracket and legs supporting the device on the bumper of the vehicle.

Referring now to the drawings, FIG. 1 shows the device 10 in a typical use in which the device 10 is mounted on the bumper B of a vehicle with a fishing rod R received in the device 10. In this manner, when the vehicle is near the water, the fisherman need not continuously hold the fishing rod but may place it in the holder. As shown in FIGS. 2-4 the device 10 comprises a frame made of a pair of spaced apart "U" shaped members 11, 12. Each member has a first leg 13 and a second leg 14. The legs 13, 14 of each member 11, 12 has a bight portion 15. The first legs 13 of each member 11, 12 are connected by a first transverse bar 16 and the second legs 14 are connected by a second transverse bar 17. The bight portion 15 of each U-shaped member 11, 12 are further connected by a transverse bar 18 at the midsections of the members 11, 12. The bar 18 extends outwardly from each of the members 11, 12. A first and second tube 19, 20 are pivotally mounted on the outwardly extending portions of the bar 18. An "L" shaped support 21 is disposed between the second legs 14 of the members 11, 12. The base 22 of the L-shaped support 21 is connected to the second legs 14 of the U-shaped members by a transverse rod 24. The stem 23 of the L-shaped support 21 is connected to the bight portions 15 of the U-shaped members by a transverse rod 25. In this manner, the L-shaped support 21 is securely mounted between the U-shaped members 11, 12 and the members are spaced apart to form a rigid frame. The stem 23 of the L-shaped support 21 has an end which extends upwardly from the bight portion 15. Near the end of the stem 23 of the L-shaped support 21 there is mounted perpendicularly thereto, a cross support 26. The cross support 26 is in the same plane as the transverse rods 24, 25 which support the "L" shaped support 21. The upper ends of the tubes 19, 20 may be pivoted to rest against the cross support 26. The cross support further has at least two U-shaped members 30 attached thereto. The tubes 19, 20, when resting against the cross support 26, are disposed between legs of the U-shaped members 30 to prevent lateral movement of the tubes. The figures show two (2) tubes mounted on the frame, however, the device 10 may have one (1) tube or more than two (2) tubes as would be apparent to persons skilled in the art.

A bracket support 27 is rotatably mounted transversely between the bight portions 15 of the U-shaped members 11, 12 adjacent to the midpoint of the bight portions 15 and toward the first leg 13 of the U-shaped members 11, 12. The bracket support 27 has an end 28 extending outwardly from the frame and above the first legs 13 of the U-shaped member 11, 12. As shown more clearly in FIG. 4, a bracket 29 is rotatably mounted on the end 28 of the support 27. The bracket 29 is capable of engaging the upper edge of the bumper B of the motor vehicle. As shown in FIG. 1, when the bracket 29 is engaged with the bumper B, the first legs 13 of the U-shaped members 11, 12 extend downwardly and contact the lower edge of the bumper B. The two points of contacts with the bumper B provide support for the frame to be mounted on the vehicle. The frame, the second legs 14, the L-shaped support 21 and the tubes 19, 20 extend outwardly from the vehicle with the tubes in a substantially upright position with respect to the ground. A fishing rod may be received in the tubes 19, 20 and the tube 11, 20 may be pivotally moved to rest between the U-shaped holder 30 on the cross support 26.

Figure 5:
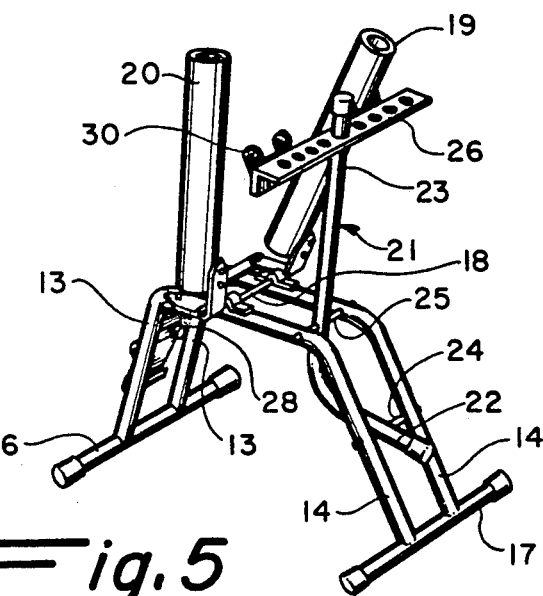
FIG. 5 is a perspective view of the device resting on a surface independently of the motor vehicle.
Figure 6:
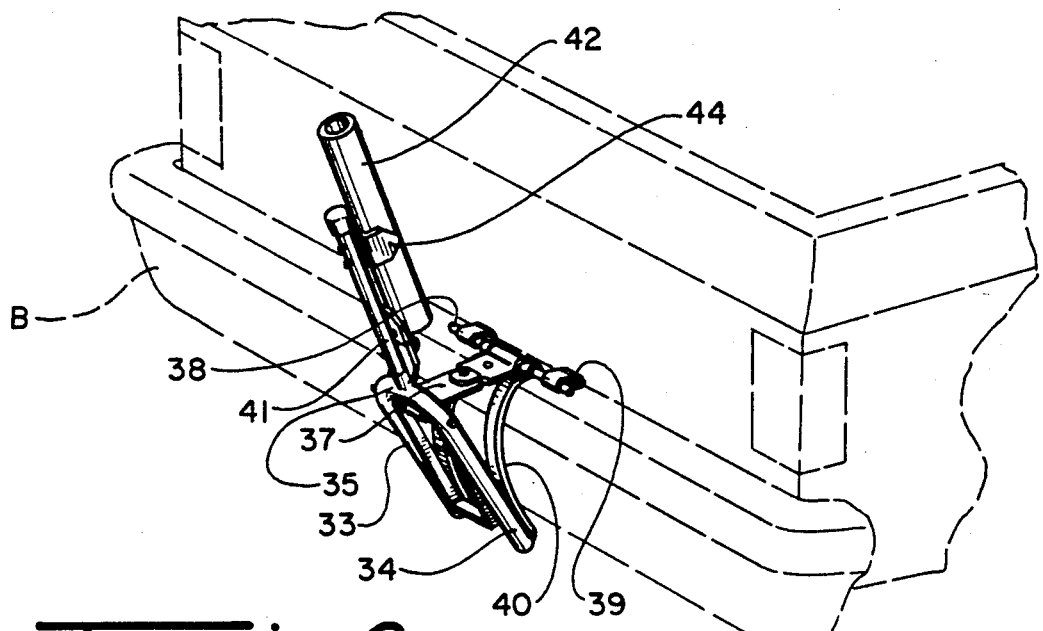
FIG. 6 is a perspective view of a second embodiment of the device showing the device mounted on the bumper of a vehicle.

As shown in FIG. 5, the device 10 may also be used independently of the vehicle. The device 10 may be placed on a substantially horizontal surface so that the first legs 13 and the second legs 14 are supported on the surface with the tubes 19, 20 and the L-shaped support 21 in a substantially upright position with respect to the surface. The first transverse bar 16 and the second transverse bar 17 connected to the ends of the legs 13, 14 provide lateral support to the device 10. In this manner, a fishing rod R may be disposed in one or more tubes 18, 19 and the tubes 18, 19 may be pivoted to rest against the cross support 26. The device 10 is portable and may be placed wherever the fisherman desires to fish.

Figure 7:
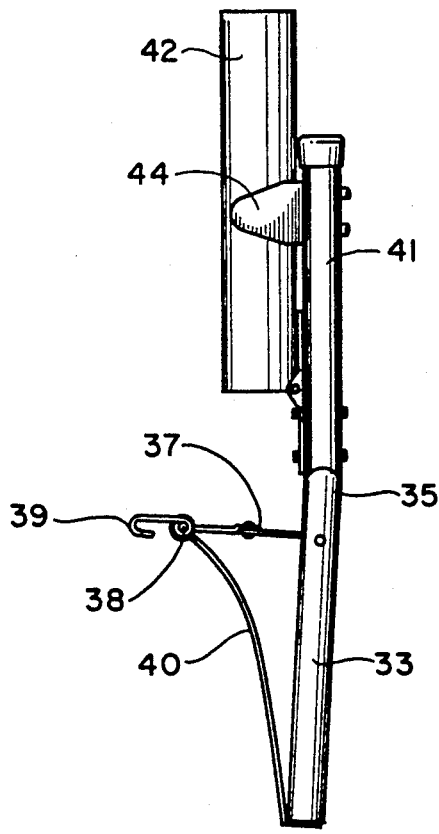
FIG. 7 is a side view of the device of FIG. 6.
Figure 8:
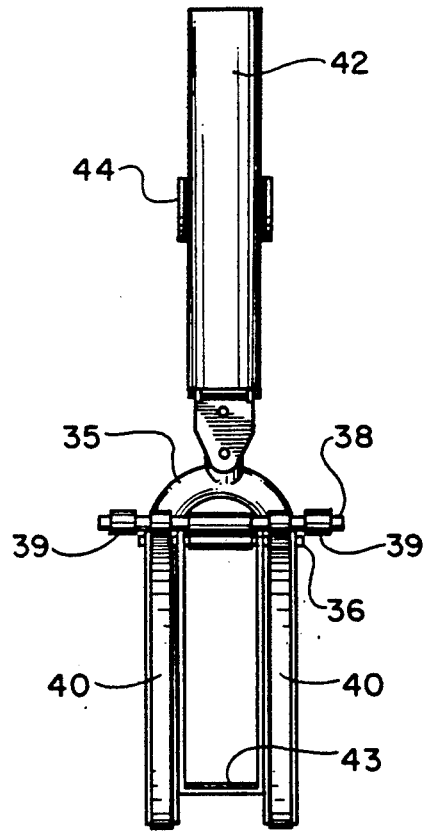
FIG. 8 is a front view of the device of FIG. 6.

A second embodiment of the device 10 is shown in FIG. 5 in a typical use mounted on a vehicle. Referring to FIGS. 7 and 8, the embodiment has a first leg 33, a second leg 34 and an intermediate bight portion 35 in a U configuration. A bar 36 extends transversely between the upper portion of the legs 33, 34. A bracket support 37 has a first end connected to the transverse bar 36 and a second end extending substantially perpendicularly outwardly from the legs 33, 34. A bracket rod 38 is connected to the second end of the bracket support 37, the rod 38 having arms extending outwarding from each side of the bracket support 37. At least one bracket 39 is rotatably mounted on the arms of the rod 38. The bracket 39 may engage the bumper B of the vehicle. A pair of arcuate support members 40 each have a first end connected to the respective lower ends of the legs 33, 34. The second end of the arcuate support members 40 are connected to the outwardly extending arms of the rod 38. The arcuate support members 40 provide support for the bracket rod 38 and the brackets 39. A support member 41 extends outwardly from the bight portion 35 and in the plane of the legs 33, 34. Pivotally mounted on the support 41 is a tube 42 with the pivot adjacent to the bight portion 35. The outwardly extending end of the support member 41 further has a U-shaped holder 44 attached thereto such that the tube may be disposed between the legs of the holder 44 to provide lateral support to the tube.

Figure 9:
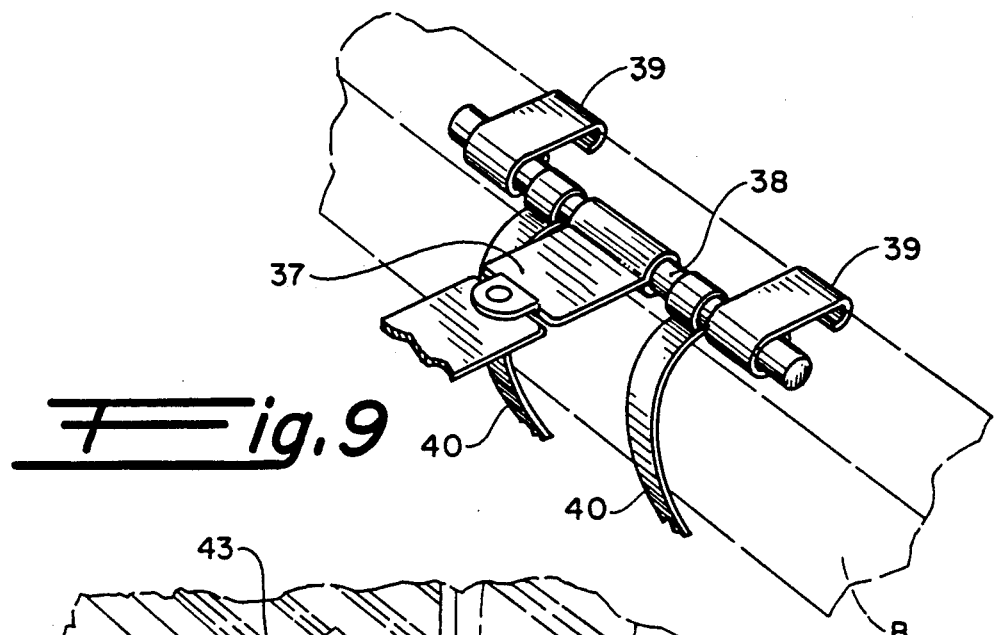
FIG. 9 is an enlarged perspective view of the device of FIG. 6 showing the bracket and the mounting of the device on the bumper of the vehicle.

As shown in FIG. 9, the device 10 is removably mounted on the bumper B of the vehicle. The bracket 39 engages the upper edge of the bumper and the end of the legs 33, 34 rest against the lower edge of the bumper. The support member 41 extends upwardly with respect to the ground and the tube 42 is pivotally rested against the support member 41 in a substantially upright position. The fishing rod may be received in the tube.

Figure 10:
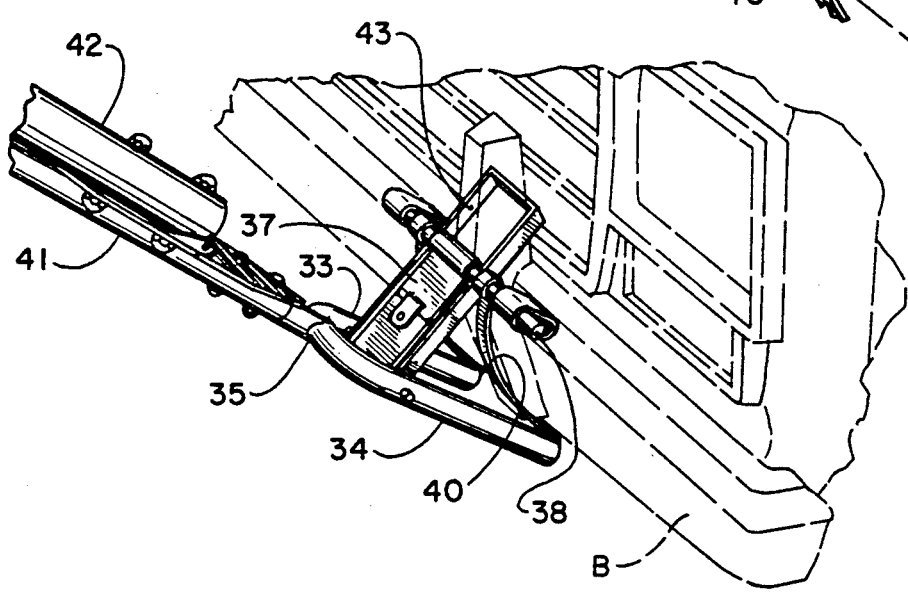
FIG. 10 is an enlarged perspective view of the device of FIG. 6 showing the mounting of the device on the bumper of the vehicle using the upright portion of the bumper for additional support.

A U-shaped leg member 43 is pivotally mounted on the bar 36 which extends between the legs 33, 34 of the frame. The base portion of the U is adjacent to the ends of the legs 33, 34. The U shaped leg member 43 may be pivoted inwardly from between the legs 33, 34 of the frame and in the direction of the bracket support 37. The leg member 43 engages a vertical post section of the bumper B as shown in FIG. 10 for these vehicles which have such a vertical post section and provide additional support for mounting the device 10 on a vehicle.

Figure 11:
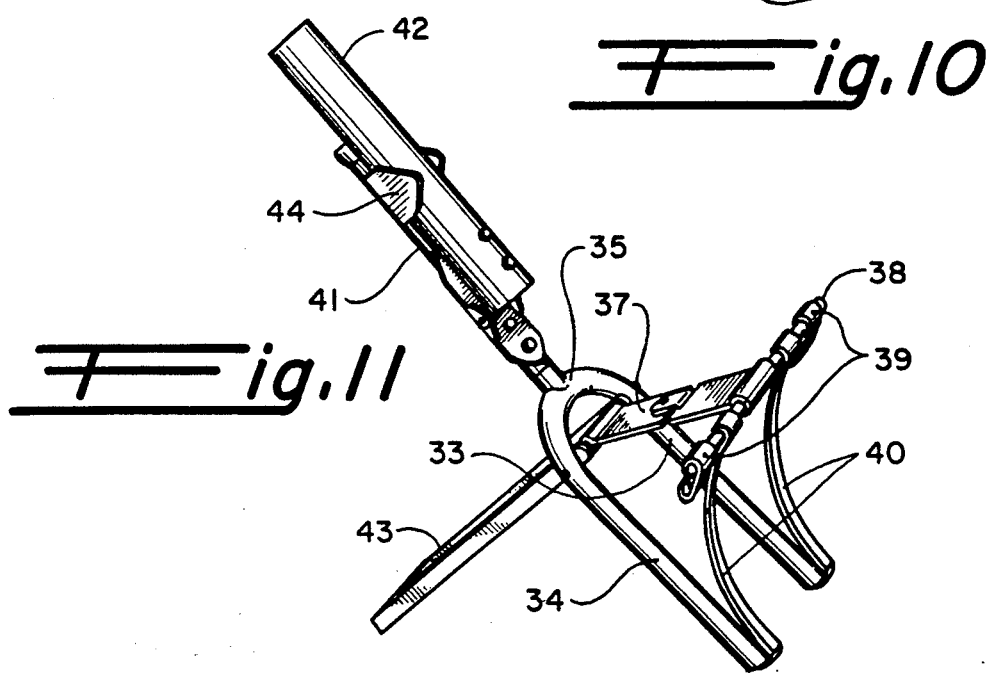
FIG. 11 is a perspective view of the device of FIG. 6 showing use of the device on a surface independent of the vehicle.

Referring to FIG. 11, the U-shaped leg member 43 may be pivoted outwardly from between the legs 32, 34 of the frame in a direction opposite from the bracket support 37. In this configuration, and in conjunction with the legs 33, 34 of the frame, the device 10 may stably rest independently of the vehicle on a substantially horizontal surface. The tube may receive a fishing pole therein.

In either embodiment, the tube has a first open end and a second, at least partially closed end to retain the fishing rod therein. The second end of the tube is pivotally mounted on the frame for movement of the tube for ease of insertion or removal of the fishing rod. Also, the pivoting action allows the fisherman to manipulate the rod more easily when a fish has been caught. The pivotability of the mounting reduces stress and damage to the fishing rod.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A fishing rod holder which can be mounted on a motor vehicle to support a fishing rod unattended by a fisherman comprising: a frame; means for removably mounting the frame on the motor vehicle; at least one tube pivotally connected to the frame such that the tube may be disposed substantially vertically with respect to the ground and the fishing rod may be received within the tube;

wherein the frame comprises a pair of spaced-apart U-shaped members, each having a first leg and a second leg, the legs connected by a bight section; the first legs of the respective members having a first transverse connecting bar therebetween; the second legs of the respective members having a second transverse connecting bar therebetween; the bight sections further having a mid-portion and being connected by a transverse bar therebetween at the mid-portion, the bar having a first end and a second end, the ends extending outwardly from the first U-shaped member and the second U-shaped member respectively; a first tube pivotally mounted on the first end of the transverse bar; a second tube pivotally mounted on the second end of the transverse bar; a cross support member having means for mounting such that the cross support member extends upwardly from the frame and is in the same plane as the second transverse bar connecting the second legs of the U shaped members; such that the tubes may be pivoted to rest against the cross support; the means for removably mounting the frame on the motor vehicle comprising a bracket support rotatably mounted between the bight sections of the U-shaped members and disposed adjacent to the mid-portion of the bight section and toward the first legs of the U-shaped members; the bracket support having an end extending outwardly from the frame and above the first legs of the U-shaped member, a bracket rotatably mounted on the end of the bracket support, the bracket capable of engaging the bumper of the motor vehicle such that when the bracket engages the bumper of the vehicle, the first legs of the frame extend downwardly therefrom to contact the bumper and provide support to mount the frame on the vehicle with the tubes, the L-shaped support and second legs extending outwardly from the vehicle such that the fishing rod may be received in the tube and pivotally mounted to rest against the cross support.

2. The fishing rod holder of claim 1, wherein the frame may be disposed on a substantially horizontal surface independently of the vehicle and is supported in a stable position by the first and second legs and the first and second transverse bars therebetween such that the fishing rod may be received in the tube and pivotally moved to rest against the cross support.

3. The fishing rod holder of claim 1, further comprising the cross member support having at least one U-shaped holder attached thereto such that the tube may rest therein to provide support for the tube to prevent lateral movement of the tube.

4. The fishing rod holder of claim 1, wherein the means for mounting the cross support member comprises an L-shaped support having a base and a stem, the L-shaped support disposed between the second legs of each U-shaped member, a transverse rod connecting the base of the L-shaped support with the respective second legs of the U-shaped members, a further transverse rod connecting the stem of the L-shaped support with the bight portion of each U-shaped member such that the L-shaped support is securely mounted between the second legs of the U-shaped members with the stem of the L-shaped support extending upwardly and outwardly from the bight sections, the stem further having an end extending outwardly from the bight section; the cross support member mounted near the end of the stem and perpendicular thereto, the cross support being in the same plane as the transverse rods connecting the base and stem of the L-shaped support.

5. A fishing rod holder which can be mounted on a motor vehicle to support a fishing rod unattended by a fisherman comprising: a frame; means for removably mounting the frame on the motor vehicle; at least one tube pivotally connected to the frame such that the tube may be disposed substantially vertically with respect to the ground and the fishing rod may be received within the tube;

wherein the frame comprises: a member having a first leg and a substantially parallel second leg, each leg having an upper portion and a lower portion; a bight section connecting the upper portion of each leg; a bar extending transversely between the upper portions of each leg; a bracket support having a first end and a second end, the first end connected to the bar between the legs and the second end extending substantially perpendicularly outwardly form the legs;

a bracket rod connected to the second end of the bracket support and having arms extending outwardly from each side of the bracket support;

at least one bracket rotatably mounted to the arms of the bracket rod such that the bracket may engage the bumper of the vehicle;

a pair of arcuate support members, each having a first end and a second end, the first end of each arcuate member connected to the respective lower portions of the first and second legs of the frame and the second end of each arcuate member connected to the respective outwardly extending arms of the bracket rod such that the bracket rod and bracket support are secured and prevented from movement; at least one support member extending outwardly from the bight section and in the plane of the legs of the frame; the tube pivotally mounted on the support member; and such that the frame may be removably mounted on the vehicle wherein when the bracket is engaged with the bumper of the vehicle, the lower portion of he legs rests against the bumper of the vehicle, such that the outward supporting member extends upwardly and outwardly from the bumper and the tube extends upwardly and outwardly for the bumper to receive the fishing rod therein.

6. The fishing rod holder of claim 5, further comprising a U-shaped leg member pivotally mounted between first and second legs of the frame on the bar extending transversely between the upper portions of the legs, such that the U-shaped leg member may be pivoted outwardly from between the legs in a direction opposite to the bracket support such that, in conjunction with the first and second legs, a stable support is provided for the frame to rest independently on a substantially horizontal surface and such that the tube is disposed with respect to the ground to retain a fishing rod therein; and the U-shaped leg member may be pivoted inwardly from between the legs in the direction of the bracket support so as to engate a vertical member of the vehicle bumper when the holder is mounted on the vehicle to further secure the holder to the vehicle.

7. The fishing rod holder of claim 5, wherein the tube has a first open end and a second, at least partially closed, end and the second end is pivotally mounted on the outward supporting member such that when the fishing rod is disposed in the tube, the fishing rod is retained in the tube.

8. A fishing rod holder which can be mounted on a bumper of a motor vehicle comprising:
an inverted U-shaped frame having a pair of spaced-apart members, a first U-shaped member and a second U-shaped member;
a pair of transverse bars, each bar connected to each U-shaped member of the frame;
a bracket mounted on the frame;
means for removably mounting the frame on the bumper of the motor vehicle such that the bracket engages the bumper and the transverse bar on the first U-shaped member of the frame contacts the bumper, thereby supporting the frame, and such that the frame may be quickly and easily mounted and dismounted from the bumper; and
at least one tube pivotally connected to the frame, the at least one tube having an open end thereon such that a fishing rod may be received within said tube.

9. The fishing rod holder of claim 8, wherein when the fishing rod holder is dismounted from the vehicle and disposed on a substantially horizontal surface independent of the vehicle, the transverse bars connecting the first U-shaped member and the second U-shaped member of the frame support the fishing rod holder in a substantially upright position.

* * * * *